Figure 1:
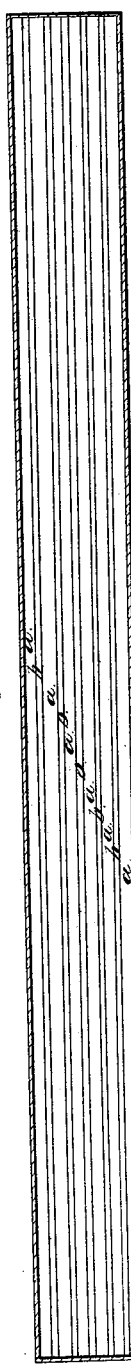

C. L. Fleischmann,

Mattress.

N° 5,275.    Patented Sep. 4, 1847.

UNITED STATES PATENT OFFICE.

C. L. FLEISCHMANN, OF WASHINGTON, DISTRICT OF COLUMBIA.

MAKING MATTRESSES, CUSHIONS, &c.

Specification of Letters Patent No. 5,275, dated September 4, 1847.

*To all whom it may concern:*

Be it known that I, CHARLES LEWIS FLEISCHMANN, of Washington city, in the District of Columbia, have invented a new and Improved Mode of Making Mattresses and in All Kinds of Upholstery-Work; and I do hereby declare that the following is a full and exact description.

The nature of my invention consists in preventing horse hair, sheep wool, moss, hair, tow, feathers, corn shucks and all such materials, except cotton, which have been hitherto used for making mattresses, cushions and all kinds of upholstery work from matting by the interposition of layers of glazed cotton batting, or cotton batting confined between paper, cloth or other like materials and thus combining materials of a strong with others of a more delicate texture.

When mattresses or any kind of upholstery work are made entirely of horse hair or of any of the above specified materials, or in a mixed state, they soon mat and become compact, and render the article stuffed, hard, and in that compact state they are liable to deteriorate and become exceedingly injurious to health from the exhalation of unpleasant odors. To obviate these inconveniences I place between thin layers of horse hair, or any of the above named materials, layers of cotton battings, which are confined between cloth, paper or other like suitable material, or cotton batting glazed on both sides, or calendered without glazing, which prevents the fibers of one material from uniting with the other; and the cotton and the other materials are provided in this manner with a surface to exert their natural elasticity against it; whereas in mattresses made in the usual way the elasticity of one fiber counteracts that of the other, and renders such articles, even when new, less elastic. This combination of confined cotton batting with other materials make the mattresses and all such stuffed articles softer; the stronger fibers give more resistance and form a combined elasticity, which makes such articles preferable to any article of that description hitherto known.

The separation of fibers in layers makes the article more durable; when exposed to a high temperature the cotton layers expand and admit a free circulation of air, which prevents the materials from spoiling, and are kept free from bad odor. The particles of dust can not accumulate, as the interposed glazed or other surfaces prevent them from passing from one layer into another, and when beaten, fly out on the sides of the ticking, which can be made in such a manner as to open on each side. Cotton has the quality of throwing off all odor or unhealthy matter, when exposed to a high temperature. None of all the known materials for such purposes, are so clean and free from all peculiar odor as cotton; animal substances on the contrary are never free from it, and when in large compact layers, they deteriorate and become insupportable and unhealthy.

By my improvement the materials used, either of animal or vegetable origin, are separated by an article which never spoils when kept dry; and the animal or vegetable materials placed between are made in thin layers, between which the air can circulate, whereby the whole is prevented from deterioration. Mattresses, cushions or any kind of upholstery work, of any shape or form are less liable to get out of order, and what is still more important it enables me to make a comfortable, durable, healthy article for considerably less than when made entirely of one and the same material.

Figure 4:
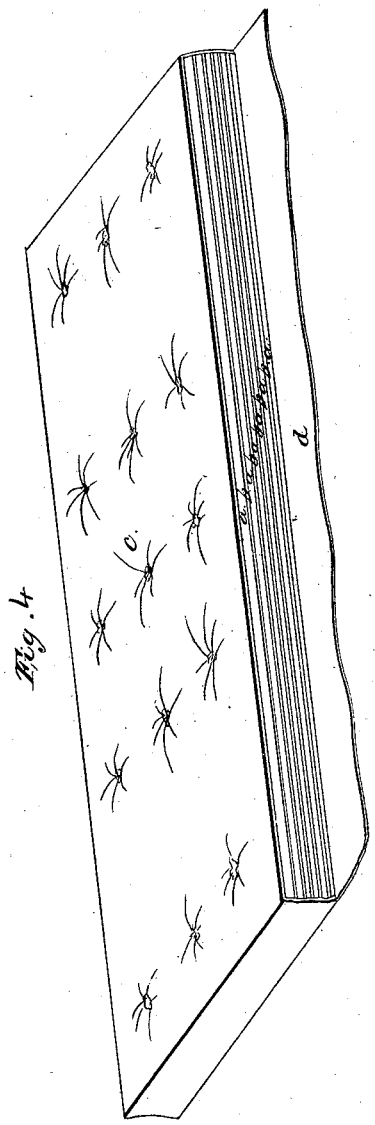

The mode of making mattresses, cushions or all kind of upholstery work is as follows: I place upon a layer of horse hair or any other specified material as seen in the accompanying drawing, Fig. 1, *a*, a layer of cotton batting *b* confined between cloth, paper or other suitable material, or cotton batting glazed on both sides; upon this I place another layer of horse hair *a*, &c., and so on, until the necessary thickness of a mattress or other article designed is obtained; then it is confined in a ticking C, see Fig. 4, made in the usual way, or with sides *d* which can be opened, to admit a free circulation of air, and allow all the dust to escape.

Figure 2:
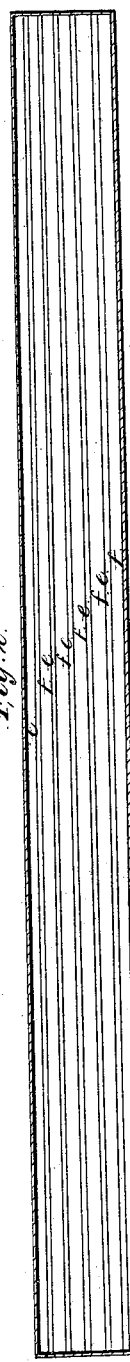
Figure 3:

Should a mattress be made for summer and winter use, I begin one side with cotton, Fig. 2, *e*, then hair, cotton, and so forth, and end with a lesser conductor of heat *f*, as for instance, horse hair, &c. The cotton being more soft will answer for the winter; the stiffer and less heat conducting material will be more pleasant for summer. In like manner I improve W. H. Robertson's cotton wadding mattress, see Fig. 3, by placing upon one of the sides of the compressed cotton wadding g, a layer of horse hair, moss or any other material, h.

What I claim as my invention and desire to secure by Letters Patent is—

1. Placing between layers of horse hair, moss, or any of the specified materials, layers of cotton batting either confined between cloth, paper or any suitable fabric, or cotton batting glazed on both sides or simply calendered, as above described.

2. The mode of making mattresses suitable for winter and summer use substantially as herein described.

Washington March 1st 1847.

CHARLES LEWIS FLEISCHMANN.

Witnesses:
A. P. BROWNE,
CHAS. M. KELLER.